United States Patent
Wu

(10) Patent No.: US 6,601,731 B2
(45) Date of Patent: Aug. 5, 2003

(54) QUICK INFLATION DEVICE WITH A SAFETY MEANS

(76) Inventor: Scott Wu, No. 6, Lane 176, Wu Fu Road, Wu Feng Hsiang, Taichung Hsien (TW)

(*) Notice: Subject to any disclaimer, the term of this patent is extended or adjusted under 35 U.S.C. 154(b) by 0 days.

(21) Appl. No.: 10/026,414

(22) Filed: Dec. 21, 2001

(65) Prior Publication Data

US 2002/0084282 A1 Jul. 4, 2002

(30) Foreign Application Priority Data

Dec. 28, 2000 (TW) .................................. 89222614 U

(51) Int. Cl.⁷ .................................................. B63B 7/06
(52) U.S. Cl. ....................................... 222/5; 222/153.14
(58) Field of Search ............................. 222/5, 153.11, 222/153.14

(56) References Cited

U.S. PATENT DOCUMENTS

| | | | |
|---|---|---|---|
| 2,722,342 A | * 11/1955 | Fox | ................................ 222/5 |
| 3,113,327 A | * 12/1963 | Cook | ............................... 222/5 |
| 3,809,288 A | * 5/1974 | Mackal | ........................... 222/5 |
| 3,815,783 A | * 6/1974 | Hirata | ............................. 222/5 |
| 4,416,393 A | * 11/1983 | Zimmerly | ........................ 222/5 |
| 6,422,420 B1 | * 7/2002 | Brown | ............................ 222/5 |

* cited by examiner

*Primary Examiner*—Kenneth Bomberg
(74) *Attorney, Agent, or Firm*—Alan D. Kamrath; Rider Bennett, LLP.

(57) ABSTRACT

A quick inflation device includes a body having a compartment for removably receiving a gas container containing pressurized gas. A gas outlet is defined in the body and has an end communicated with the compartment. A safety device comprises a first end and a second end. The second end of the safety device is releasably engaged with the body when in a safety position. The first end of the safety device is movable between a non-actuating position and an actuating position. A piercing member mounted in the body is not actuated by the first end of the safety device when in the non-actuating position. The piercing member is actuated by the first end of the safety device to unseal a sealing member in the gas container when in the actuating position.

20 Claims, 7 Drawing Sheets

QUICK INFLATION DEVICE WITH A SAFETY MEANS

BACKGROUND OF THE INVENTION

1. Field of the Invention

The present invention relates to a quick inflation device with a safety means to prevent inadvertent actuation of the device.

2. Description of the Related Art

FIG. 6 of the drawings illustrates a conventional quick inflation device comprising a valve body 1' in which a pressure constant valve 2', a striking member 15', and an accumulator 16' are mounted. A gas container 4' containing pressurized $CO_2$ is coupled to a coupler 3' on an end of the valve body 1'. When a pull ring 17' is pulled out of the valve body 1', a safety pin 6' is removed, and the striking member 15' is moved by accumulated pressure in the accumulator 16' to pierce a membrane 22' in the pressure constant valve 2'. Thus, the pressurized $CO_2$ in the gas container 4' exits an output 18' of the valve body 1' through the coupler 3' and the pressure constant valve 2'. Although the device may provide a quick inflation function, the pull ring 17' is, however, apt to be inadvertently removed.

FIG. 7 illustrates another conventional inflation device comprising a cylinder 5" for holding a gas container 4" containing pressurized air. When inflation is required, a turn knob 3" is turned to push the gas container 4" toward a needle 121" in the cylinder 5" until a membrane 41" in the gas container 4" is pierced by the needle 121" for inflation purpose. However, turning of the turn knob 3" is time-consuming.

SUMMARY OF THE INVENTION

An object of the present invention is to provide a quick inflation device with a safety means to prevent inadvertent actuation of the device while providing a quick inflation function.

A quick inflation device in accordance with the present invention comprises:

- a body comprising a compartment for removably receiving a gas container containing pressurized gas, the gas container being sealed by a sealing member;
- a gas outlet defined in the body and having a first end communicated with the compartment and a second end, a nozzle being mounted in the second end of the gas outlet for supplying pressurized gas from the gas container to an object to be inflated;
- means mounted in the body for unsealing the sealing member; and
- safety means comprising a first end and a second end, the second end of the safety means being releasably engaged with the body when in a safety position, the first end of the safety means being movable between a non-actuating position and an actuating position, the unsealing means not being actuated by the first end of the safety means when in the non-actuating position, the unsealing means being actuated by the first end of the safety means to unseal the sealing member when in the actuating position.

In accordance with a preferred embodiment of the invention, a quick inflation device comprises:

- a body comprising a first compartment for removably receiving a gas container containing pressurized gas, the gas container being sealed by a sealing member;
- a gas outlet defined in the body and having a first end communicated with the first compartment and a second end, a nozzle being mounted in the second end of the gas outlet for supplying pressurized gas from the gas container to an object to be inflated;
- means mounted in the body for unsealing the sealing member;
- a safety lever including a first end pivotally mounted to the body and a second end for manual operation, the second end of the safety lever being engaged with the body when in a safety position, the second end of the safety lever being movable between an inoperative position and an operative position when the second end of the safety lever is disengaged from the body; and
- a trigger including a first end pivotally mounted to the body and a second end operably connected to the unsealing means, the second end of the trigger being movable between a non-actuating position and an actuating position; and
- the safety lever being pivotable independent of the trigger when not in the operative position, the trigger and the safety lever pivot jointly when the safety lever is pivoted from the operative position along a direction away from the safety position;
- the unsealing means not being actuated by the second end of the trigger when the trigger is in the non-actuating position, the unsealing means being actuated by the second end of the trigger to unseal the sealing member when the trigger is in the actuating position.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
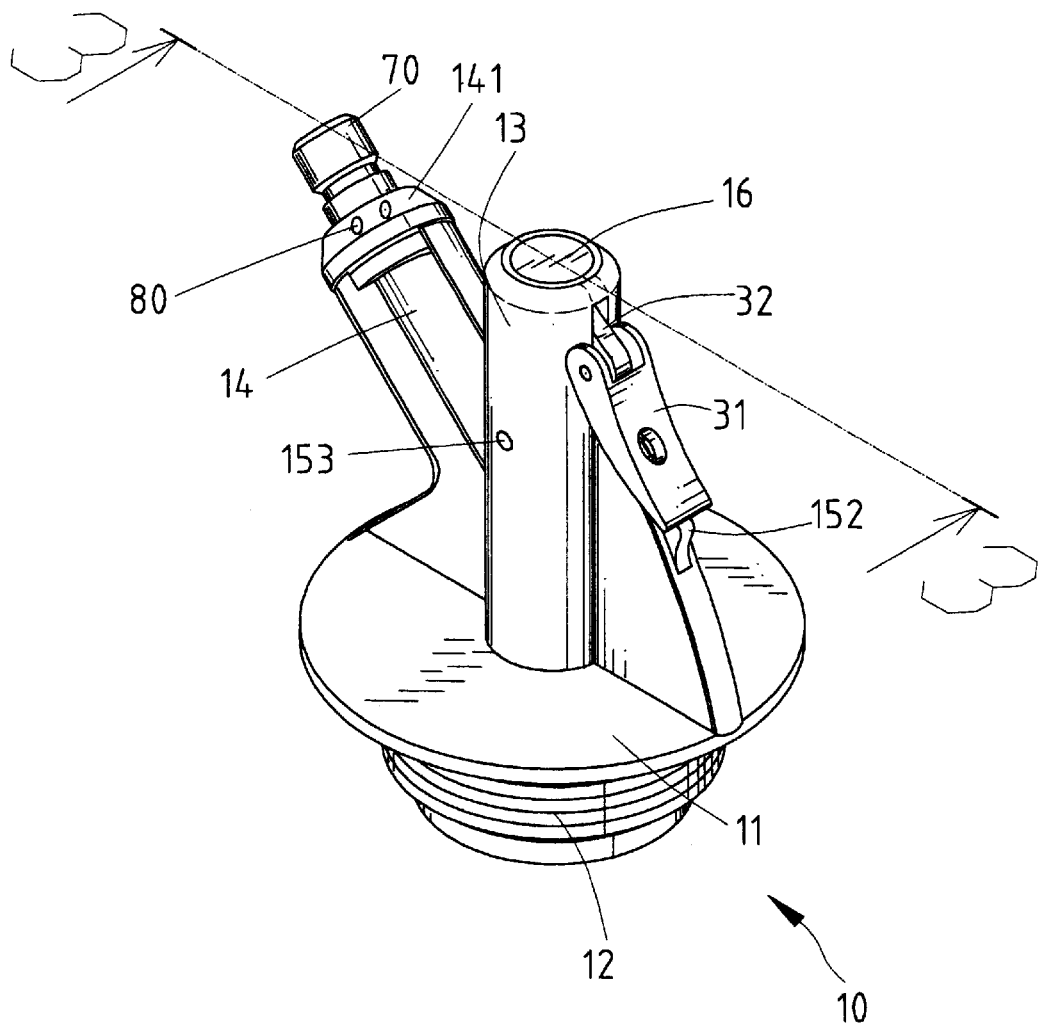
FIG. 1 is a perspective view of a quick inflation device in accordance with the present invention.
Figure 2:
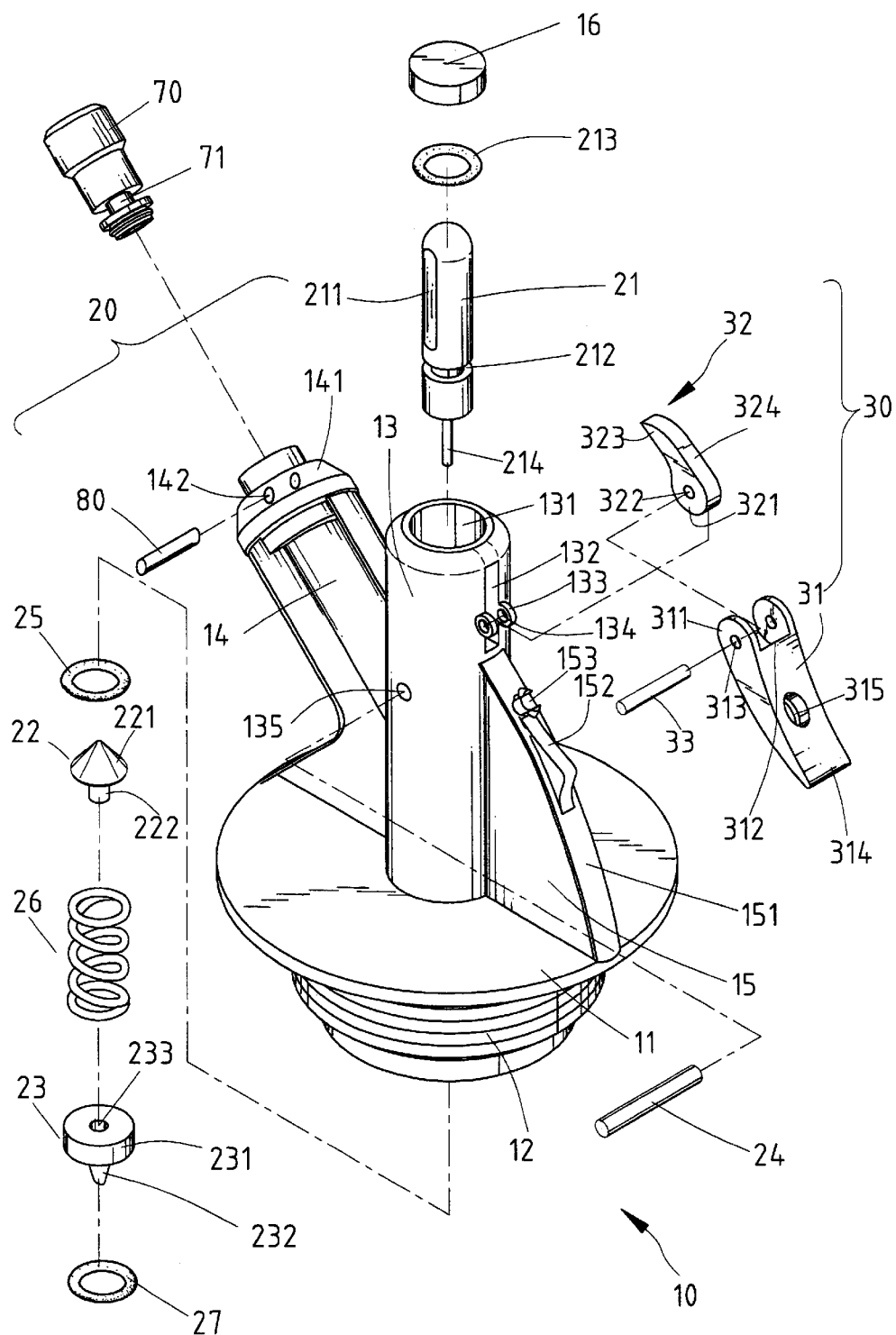
FIG. 2 is an exploded perspective view of the quick inflation device in accordance with the present invention.
Figure 3:
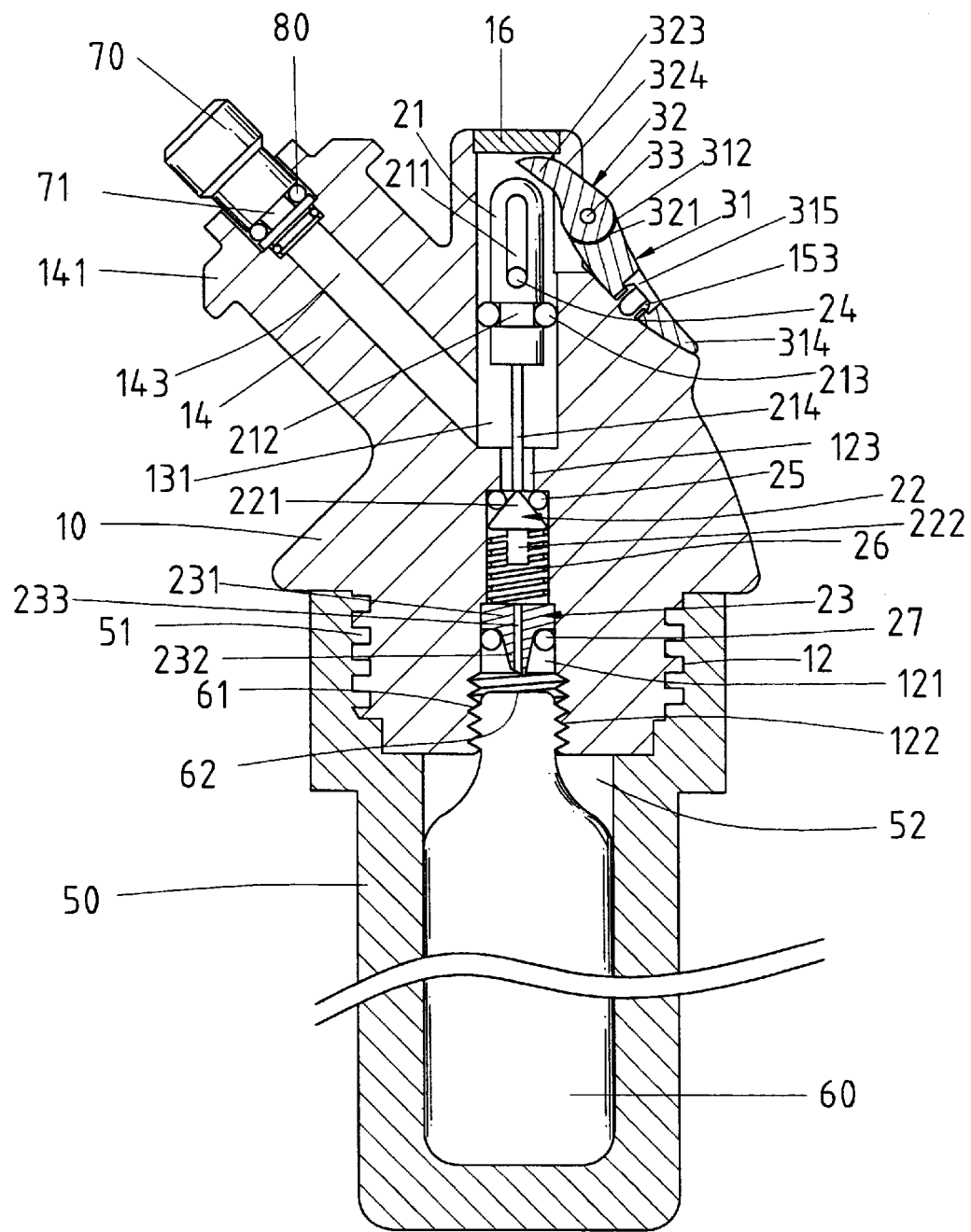
FIG. 3 is a sectional view taken along plane 3—3 in FIG. 1.

Referring to FIGS. 1 through 3, a quick inflation device in accordance with the present invention generally includes a body 10 including a first end (in the form of a planar disk 11 in this embodiment) and a second end having an outer threading 12 for releasably engaging with an inner threading 51 of a gas container holder 50 having a hollow interior 52 that receives a gas container 60 containing pressurized gas (e.g., CO2). In this embodiment, the second end of the body 10 includes a first compartment 121 having a threaded section 122 for threadedly engaging with an outer threading 61 of the gas container 60. The gas container 60 includes a sealing member (e.g., a membrane 62) for sealing the gas container 60.

A second compartment 131 is defined in the body 10 and communicated with the first compartment 121 via a passage 123. Preferably, the passage 123 has a diameter smaller that that of the first compartment 121 and also smaller than that of the second compartment 131. In this embodiment, the second compartment 131 is defined in an upright column 13 extending from the disk 11. The upright column 13 includes a slot 132 and two lugs 133 on two sides of the slot 132. A sector-like plate 15 is provided on an outer periphery of the upright column 13 and includes an arcuate face 151 on which a safety lever engaging member 153 is formed. It is noted that the upright column 13 and the sector-like plate 15 can be deemed as a part of the body 10.

The quick inflation device further includes a safety means 30 comprising a safety lever 31 and a trigger 32. In this embodiment, the safety lever 31 includes a first end having a pair of spaced lugs 311 and a second operative end 314. A pin 33 extends through aligned holes 134 in the lugs 133 of the upright column 13, through aligned holes 313 of the lugs 311 of the safety lever 31 and through hole 322 of trigger 32. Thus, the safety lever 31 is pivotally mounted to the upright column 13. The safety lever 31 further includes a positioning hole 315 for releasably engaging with the safety lever engaging member 153. Further, the safety lever 31 includes an actuating face 312 adjacent to the lugs 311. The trigger 32 includes a first end 321 through which the hole 322 extends, an actuating face 324 for cooperating with the actuating face 312 of the safety lever 31 and a second end 323 that is operably engagable with an unsealing means 20 for unsealing the gas container 60.

The body 10 further includes an outlet passage 143 having a first end communicated with the first compartment 121 via the passage 123. The outlet passage 143 further includes a second end 141 to which a nozzle 70 is mounted. An object to be inflated is coupled with the nozzle 70 when inflation is required. An O-ring is mounted in an annular groove of the nozzle 70 to prevent leakage. In this embodiment, the outlet passage 143 is defined in an inclined column 14 extending from the disk 11. Positioning pins 80 are extended through transverse holes 142 in the second end 141 of the outlet passage 143 and into an annular groove 71 of the nozzle 70 to thereby secure the nozzle 70 in place. It is noted that the inclined column 14 and the sector-like plate 15 can be deemed as a part of the body 10.

The unsealing means 20 includes a striking member 21, a release valve 22, and a piercing member 23. The striking member 21 is mounted in the second compartment 131 of the body 10 and includes a longitudinal slot 211. A pin 24 is extended through a transverse hole 135 in the upright column 13 and the longitudinal slot 211 of the striking member 21 to guide longitudinal sliding movement of the striking member 21 in the second compartment 131. An O-ring 213 is mounted in an annular groove 212 in an outer periphery of the striking member 21 to prevent leakage of pressurized gas from the gas container 60 via the second compartment 131. A lid 16 is provided to close the second compartment 131 in the upright column 13. The striking member 21 further includes a striking pin 214 extending through the passage 123 into the first compartment 121.

The release valve 22 and the piercing member 23 are mounted in the first compartment 121. The release valve 22 includes a stem 222 and a cone 221 on an end of the stem 222. As illustrated in FIG. 3, the pointed end (not labeled) of the cone 221 is in contact with the striking pin 214, and an O-ring 25 is mounted between the cone 221 and an end face defining the first compartment 121 to prevent leakage of pressurized gas. An elastic element 26 has a first end attached to the stern 222 and a second end attached to the piercing member 23. In this embodiment, the piercing member 23 includes a circular member 231 having a longitudinal hole 233 and a needle 232 projecting from a side of the circular member 231. Preferably, the longitudinal hole 233 extends through the needle 232. An O-ring 27 is received around the needle 232 and abuts with the circular member 231.

Referring to FIG. 3, the safety lever 31 rests on a resting face 152 of the plate 15 and is engaged with the safety lever engaging member 153. Namely, the safety means 30 is in a safety position not allowing movement of the striking member 21 of the unsealing means 20. The release valve 22 is in a sealing position blocking the passage 123. The membrane 62 of the gas container 60 seals the gas container 60.

Figure 4:
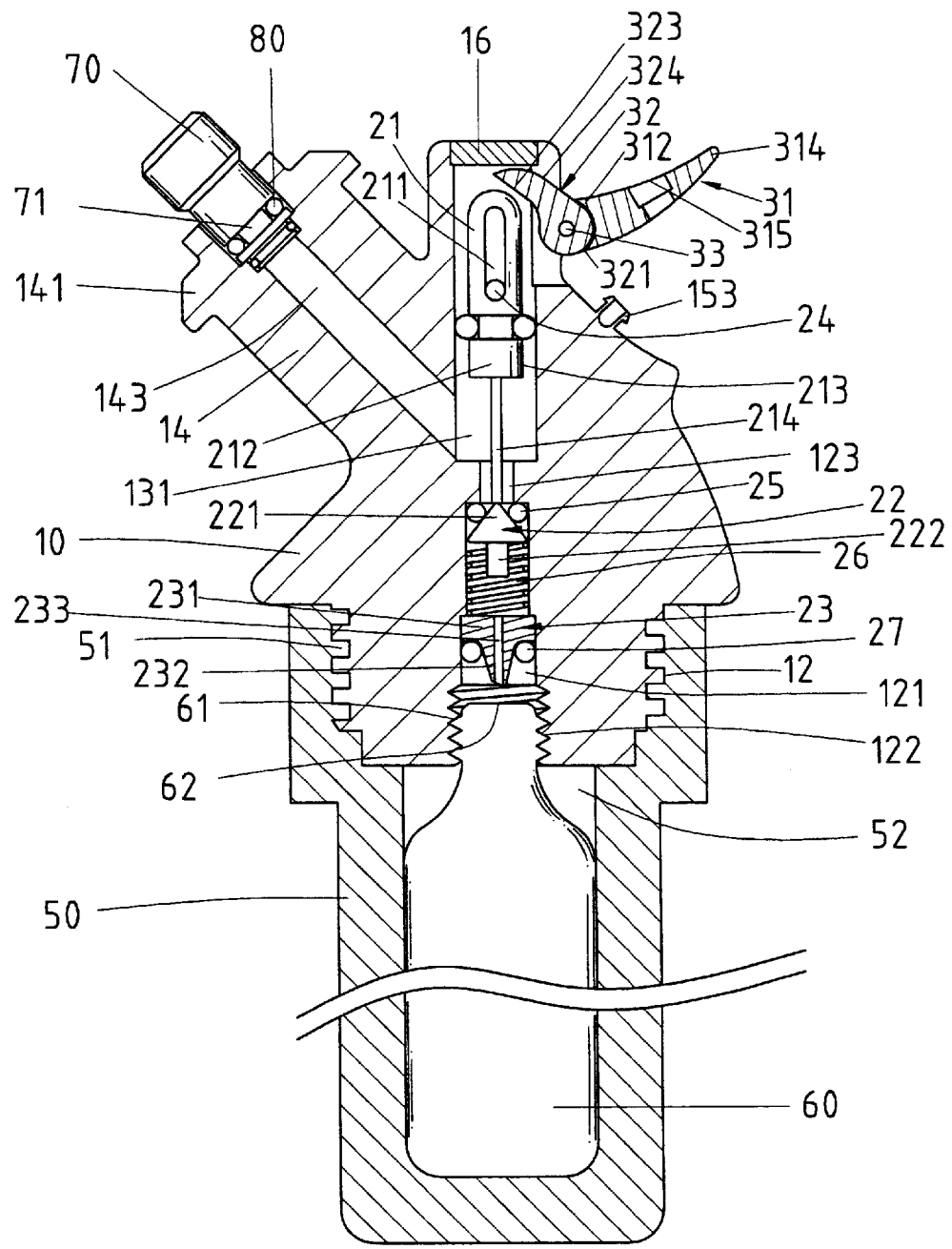
FIG. 4 is a sectional view similar to FIG. 3, wherein a safety lever of the quick inflation device is disengaged from a safety position.
Figure 5:
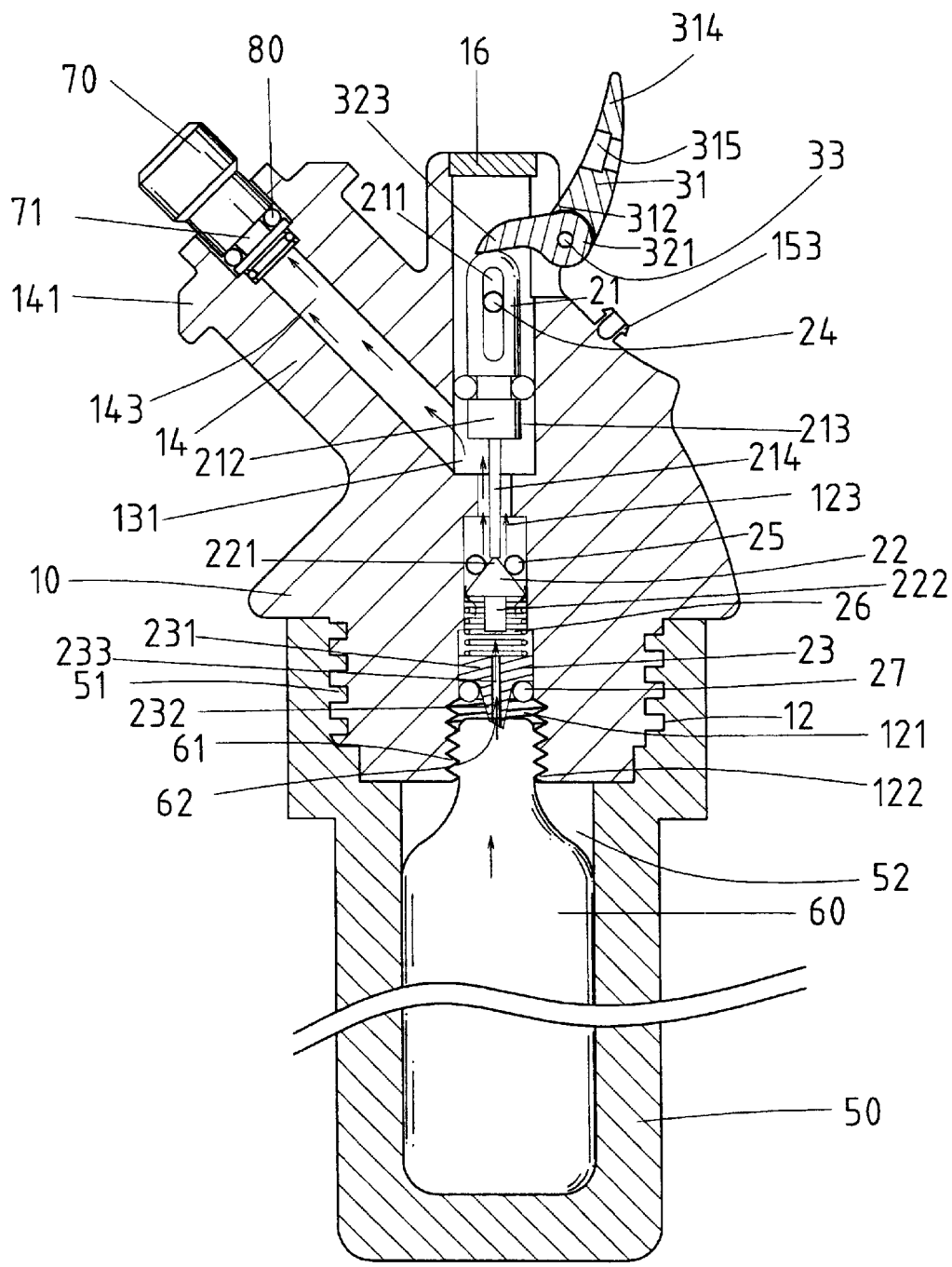
FIG. 5 is a sectional view similar to FIG. 4, wherein the safety lever is pivoted to proceed with quick inflation.
Figure 6:
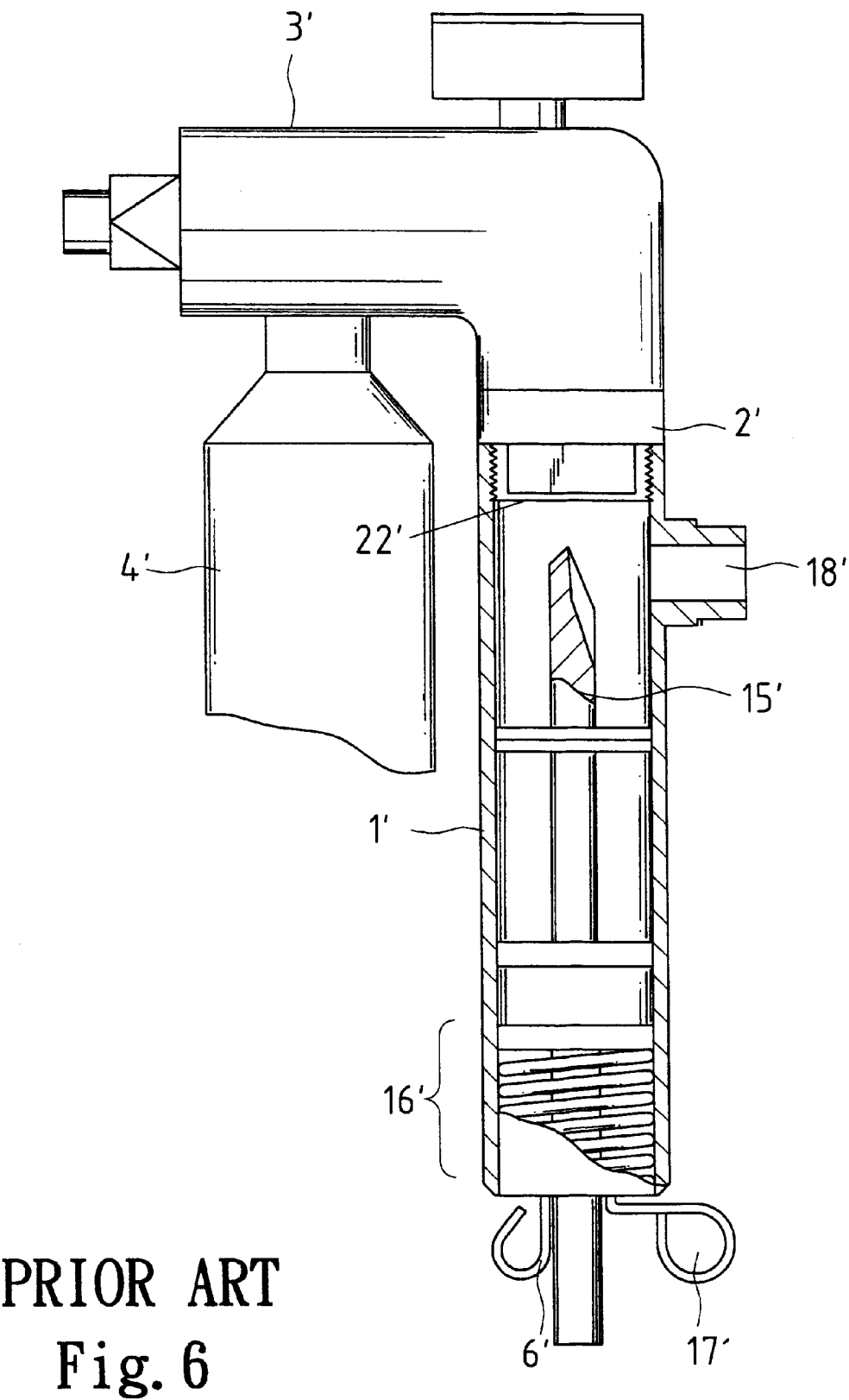
FIG. 6 is a sectional view of a conventional quick inflation device.
Figure 7:
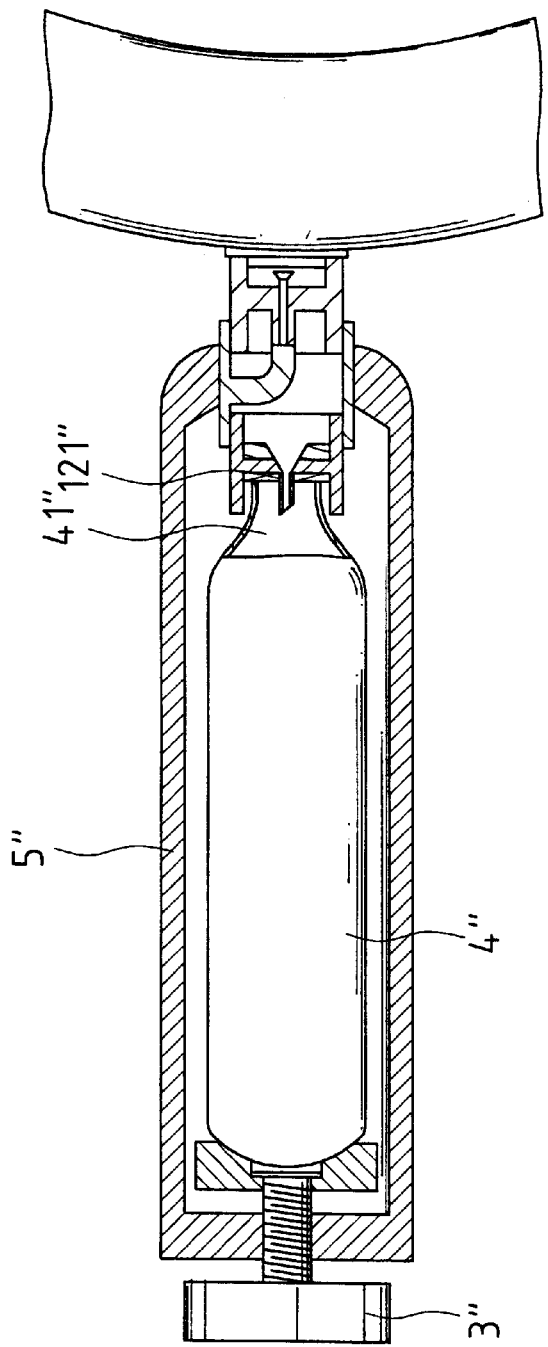
FIG. 7 is a sectional view of another conventional inflation device.

When inflation is required, the safety lever 31 is pivoted and thus disengaged from the safety lever engaging member 153 until the actuating face 312 of the safety lever 31 is in contact with the actuating face 324 of the trigger 32, best shown in FIG. 4. Next, as shown in FIG. 5, the safety lever 31 is further pivoted toward the trigger 32 and thus urges the latter to pivot about the pin 33 together with the former. Thus, the second end 323 of the trigger 32 urges the striking member 21 to slide toward the gas container 60. The striking pin 214 urges the release valve 22 and the piercing member 23 toward the gas container 60 and compresses the elastic element 26. As illustrated in FIG. 5, the passage 123 is open, as the release valve 22 is moved to a release position not blocking the passage 123. The piercing member 23 pierces the membrane 62 in the gas container 60, and the pressurized gas in the gas container 60 exits the body 10 after passing through the longitudinal hole 233 of the piercing member 23, the first compartment 121, the passage 123, the outlet passage 143, and the nozzle 70. Thus, quick inflation is obtained.

According to the above description, it is appreciated that the quick inflation device in accordance with the present invention will not be inadvertently triggered by means of provision of two-stage operation of the safety lever 31. In brief, the second end of the safety lever is movable between an inoperative position and an operative position when the second end of the safety lever is disengaged from the body. The second end of the trigger is movable between a non-actuating position and an actuating position. The safety lever is pivotable independent of the trigger when not in the operative position. The trigger and the safety lever pivot jointly when the safety lever is pivoted from the operative position along a direction away from the safety position. The unsealing means is not actuated by the second end of the trigger when the trigger is in the non-actuating position. The unsealing means is actuated by the second end of the trigger to unseal the sealing member when the trigger is in the actuating position.

Although the invention has been explained in relation to its preferred 11 embodiment, it is to be understood that many other possible modifications and variations can be made without departing from the scope of the invention as hereinafter claimed.

What is claimed is:

1. A quick inflation device comprising:
   a body comprising a first compartment for removably receiving a gas container containing pressurized gas, the gas container being sealed by a sealing member;
   an outlet passage defined in the body and having a first end communicated with the first compartment and a second end, a nozzle being mounted in the second end of the outlet passage for supplying pressurized gas from the gas container to an object to be inflated;

means mounted in the body for unsealing the sealing member;

a safety lever including a first end pivotally mounted to the body about an axis and a second end for manual operation, the second end of the safety lever being engaged with the body when in a safety position, the second end of the safety lever being movable between an inoperative position and an operative position when the second end of the safety lever is disengaged from the body; and a trigger including a first end pivotally mounted to the body about the axis and a second end operably connected to the unsealing means, the second end of the trigger being movable between a non-actuating position and an actuating position;

the safety lever being pivotable about the axis independent of the trigger when not in the operative position, the trigger and the safety lever pivot jointly about the axis when the safety lever is pivoted from the operative position along a direction away from the safety position;

the unsealing means not being actuated by the second end of the trigger when the trigger is in the non-actuating position, the unsealing means being actuated by the second end of the trigger to unseal the sealing member when the trigger is in the actuating position.

2. The quick inflation device as claimed in claim 1, wherein the unsealing means comprises a striking member, a release valve, and a piercing member, the striking member having an end operably connected to the second end of the trigger, the striking member including a striking pin, the release valve being movable between a sealing position not allowing flow of pressurized gas from the gas container into the outlet passage and a release position allowing flow of pressurized gas from the gas container into the outlet passage, the piercing member located between the sealing member of the gas container and the release valve;

wherein the piercing member is outside the gas container when the trigger is in the non-actuating position; and wherein the piercing member is urged by the trigger to break the sealing member when the trigger is in the actuating position.

3. The quick inflation device as claimed in claim 2, wherein the compartment of the body includes an inner threading for releasably engaging with an outer threading of the gas container.

4. The quick inflation device as claimed in claim 3, wherein the body includes an outer threading, with the quick inflation device further comprising a gas container holder for receiving the gas container, with the gas container holder including an inner threading for engaging with the outer threading of the body.

5. The quick inflation device as claimed in claim 2, wherein the body includes a safety lever engaging member, and wherein the safety lever includes a positioning hole for releasably engaging with the safety lever engaging member.

6. A quick inflation device comprising:

a body comprising a first compartment for removably receiving a gas container containing pressurized gas, the gas container being sealed by a sealing member;

an outlet passage defined in the body and having a first end communicated with the first compartment and a second end, a nozzle being mounted in the second end of the outlet passage for supplying pressurized gas from the gas container to an object to be inflated;

means mounted in the body for unsealing the sealing member;

a safety lever including a first end pivotally mounted to the body and a second end for manual operation, the second end of the safety lever being engaged with the body when in a safety position, the second end of the safety lever being movable between an inoperative position and an operative position when the second end of the safety lever is disengaged from the body; and a trigger including a first end pivotally mounted to the body and a second end operably connected to the unsealing means, the second end of the trigger being movable between a non-actuating position and an actuating position;

the safety lever being pivotable independent of the trigger when not in the operative position, the trigger and the safety lever pivot jointly when the safety lever is pivoted from the operative position along a direction away from the safety position;

the unsealing means not being actuated by the second end of the trigger when the trigger is in the non-actuating position, the unsealing means being actuated by the second end of the trigger to unseal the sealing member when the trigger is in the actuating position, wherein the body includes a second compartment into which the second end of the trigger extends, the second compartment being communicated with the first compartment, the first end of the trigger and the safety lever being located outside the body.

7. The quick inflation device as claimed in claim 6, wherein the body includes a slot communicated with the second compartment, the second end of the trigger extending into the second compartment via the slot, two lugs being formed on two sides of the slot, a pin extending through the first end of the trigger and the first end of the safety lever, thereby pivotally mounting the trigger and the safety lever to the body.

8. The quick inflation device as claimed in claim 7, wherein the unsealing means comprises a striking member, a release valve, and a piercing member, the striking member being mounted in the second compartment and having an end operably connected to the second end of the trigger, the striking member including a striking pin extending into the first compartment of the body, the release valve being mounted in the first compartment and movable between a sealing position not allowing flow of pressurized gas from the gas container into the outlet passage and a release position allowing flow of pressurized gas from the gas container into the outlet passage, the piercing member being mounted in the first compartment and located between the sealing member of the gas container and the release valve;

wherein the piercing member is outside the gas container when the trigger is in the non-actuating position; and wherein the piercing member is urged by the trigger to break the sealing member when the trigger is in the actuating position.

9. The quick inflation device as claimed in claim 8, further comprising an elastic element mounted between the piercing member and the release valve.

10. The quick inflation device as claimed in claim 9, wherein the release valve includes a stem to which an end of the elastic element is attached, the release valve further including a cone formed on an end of the stem, further comprising an O-ring mounted between the cone and an end face defining the first compartment.

11. The quick inflation device as claimed in claim 8, wherein the body includes an upright column extending from an end thereof, the second compartment being defined in the upright column.

12. The quick inflation device as claimed in claim 11, wherein the body includes an inclined column extending from the end thereof, the outlet passage being defined in the inclined column.

13. The quick inflation device as claimed in claim 12, further comprising a lid for closing the second compartment.

14. The quick inflation device as claimed in claim 11, wherein the striking member includes a longitudinal slot, the upright column including a transverse hole, further including a pin extending through the transverse hole of the upright column and the longitudinal slot of the striking member to thereby guide longitudinal sliding movement of the striking member in the second compartment.

15. The quick inflation device as claimed in claim 14, wherein the upright column includes a passage for communicating the second compartment with the first compartment, the passage having a diameter smaller than that of the first compartment and smaller than that of the second compartment, the striking pin extending from the second compartment into the first compartment via the passage.

16. The quick inflation device as claimed in claim 15, wherein the striking member includes an annular groove in an outer periphery thereof, further including an O-ring mounted in the annular groove of the striking member to prevent leakage of pressurized gas via the second compartment.

17. The quick inflation device as claimed in claim 8, wherein the piercing member includes a member and a needle extending from a side of the member, a longitudinal hole extending through the member and the needle.

18. The quick inflation device as claimed in claim 6, wherein the compartment of the body includes an inner threading for releasably engaging with an outer threading of the gas container.

19. The quick inflation device as claimed in claim 18, wherein the body includes an outer threading, with the quick inflation device further comprising a gas container holder for receiving the gas container, with the gas container holder including an inner threading for engaging with the outer threading of the body.

20. The quick inflation device as claimed in claim 6, wherein the body includes a safety lever engaging member, and wherein the safety lever includes a positioning hole for releasably engaging with the safety lever engaging member.

* * * * *